(12) United States Patent
Swift

(10) Patent No.: US 6,308,274 B1
(45) Date of Patent: Oct. 23, 2001

(54) LEAST PRIVILEGE VIA RESTRICTED TOKENS

(75) Inventor: Michael M. Swift, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/096,679

(22) Filed: Jun. 12, 1998

(51) Int. Cl.$^7$ .............................. G06F 12/14; G06F 1/00; G06F 13/00; G06F 15/40
(52) U.S. Cl. ..................... 713/201; 713/200; 713/169; 713/159; 713/172; 713/173; 713/170; 710/200; 710/220; 710/241; 710/242; 710/243; 710/244
(58) Field of Search ..................................... 713/200, 201, 713/169, 170, 172, 173, 159; 710/240, 200, 220, 241, 242, 243, 244

(56) References Cited

U.S. PATENT DOCUMENTS

| 4,962,449 | 10/1990 | Schlesinger . | |
|---|---|---|---|
| 5,138,712 | * 8/1992 | Corbin | 713/200 |
| 5,276,901 | * 1/1994 | Howell et al. | 707/9 |

(List continued on next page.)

FOREIGN PATENT DOCUMENTS

| 0 398 645 | 11/1990 | (EP) . |
| 0 465 016 | 1/1992 | (EP) . |
| 0 588 415 | 3/1994 | (EP) . |
| 0 697 662 | 2/1996 | (EP) . |

(List continued on next page.)

OTHER PUBLICATIONS

Frost, Jim "Windows NT Security", May 1995, pp. 1–5, retrieved on Jun. 27, 2001 from the Internet <http://world-.std.com/~jimf/papers/nt–security/nt–security.html>.

Asche, Ruediger R. "Windows NT Security in Theory and Practice", May 1995, pp. 1–14, retrieved on Jun. 27, 2001 from the Internet:<http://msdn.microsoft.com/library/te-chart/msdn–seccpp.htm>.

Asche, Ruediger R. "The Guts of Security", May 1995, pp. 1–26, retrieved on Jun. 27, 2001 from the Internet:<http://msdn.microsoft.com/library/techart/msdn_secguts.htm>.

(List continued on next page.)

Primary Examiner—Thomas Lee
Assistant Examiner—Katharina Schuster
(74) Attorney, Agent, or Firm—Michalik & Wylie, PLLC

(57) ABSTRACT

A method and mechanism to enforce reduced access via restricted access tokens. Restricted access tokens are based on an existing token, and have less access than that existing token. A process is associated with a restricted token, and when the restricted process attempts to perform an action on a resource, a security mechanism compares the access token information with security information associated with the resource to grant or deny access. Application programs may have restriction information stored in association therewith, such that when launched, a restricted token is created for that application based on the restriction information thereby automatically reducing that application's access. Applications may be divided into different access levels such as privileged and non-privileged portions, thereby automatically restricting the actions a user can perform via that application. Also, the system may enforce running with reduced access by running user processes with a restricted token, and then requiring a definite action by the user to specifically override actions that are restricted by temporarily running with the user's normal token.

43 Claims, 11 Drawing Sheets

U.S. PATENT DOCUMENTS

| | | |
|---|---|---|
| 5,321,841 | 6/1994 | East et al. . |
| 5,390,247 | 2/1995 | Fischer . |
| 5,412,717 | 5/1995 | Fischer . |
| 5,506,961 * | 4/1996 | Carlson et al. ................ 713/200 |
| 5,542,046 * | 7/1996 | Carlson et al. ................ 713/200 |
| 5,638,448 | 6/1997 | Nguyen . |
| 5,649,099 | 7/1997 | Theimer et al. . |
| 5,675,782 * | 10/1997 | Montague et al. ............ 713/201 |
| 5,678,041 * | 10/1997 | Baker et al. ..................... 707/9 |
| 5,680,461 | 10/1997 | McManis . |
| 5,682,478 | 10/1997 | Watson et al. . |
| 5,745,676 * | 4/1998 | Hobson et al. ................ 713/200 |
| 5,757,916 | 5/1998 | MacDoran et al. . |
| 5,761,669 | 6/1998 | Montague et al. . |
| 5,812,784 | 9/1998 | Watson et al. . |
| 5,826,029 * | 10/1998 | Gore, Jr. et al. ............... 709/227 |
| 5,845,067 | 12/1998 | Porter et al. . |
| 5,922,073 | 7/1999 | Shimada . |
| 5,925,109 * | 7/1999 | Bartz ............................. 710/14 |
| 5,940,591 | 8/1999 | Boyle et al. . |
| 5,941,947 * | 8/1999 | Brown et al. ................... 709/225 |
| 5,949,882 * | 9/1999 | Angelo .......................... 713/200 |
| 5,983,270 | 11/1999 | Abraham et al. . |
| 5,983,350 | 11/1999 | Minear et al. . |
| 6,081,807 * | 6/2000 | Story et al. .................... 707/101 |
| 6,105,132 | 8/2000 | Fritch et al. . |

FOREIGN PATENT DOCUMENTS

| | | |
|---|---|---|
| 0 813 133 | 12/1997 | (EP) . |
| WO 96/05549 | 2/1996 | (WO) . |
| WO 96/13113 | 5/1996 | (WO) . |
| WO 97/15008 | 4/1997 | (WO) . |
| WO 97/26734 | 7/1997 | (WO) . |

OTHER PUBLICATIONS

Soshi et al. "The Saga Security System: A Security Architechture for Open Distributed Systems", IEEE, 1997, pp. 53–58.*

"Java Security Model: Java Protection Domains," http://java.sun.com/security/handout.html, printed Nov. 11, 1999.

Anon, "Privilege Control Mechanism for UNIX Systems," *IBM Technical Disclousure Bulletin*, vol.34, No. 7b pp. 477–479, Dec. 1991.

Erdos et al., "Security Reference Model for the Java Developer's Kit 1.0.2," *Java Security Reference Model*, Nov. 13, 1996, http://www.javasoft.com/security/SRM.html printed Jul. 14, 1999.

Fritzinger et al., "Java Security,"1996, http://java.sun.com/security/whitepaper.txt.

Mazieres, David and M. Frans Kaashoek, "Secure Applications Need Flexible Operating Systems," *6th Workshop on Hot Topics in Operating Systems (HotOS–VI)*, May 5–6, 1997, http://www.eecs.harvard.edu/hotos/.

Goldstein, Ted, "The Gateway Security Model in the Java Commerce Client," *The Source for Java ™Technology*, 1997, http://www.java.sun.com/products/commerce/docs/whitepapers/security/JCC_gateway.html printed Jul. 14, 1999.

Mazieres, David and M. Frans Kaashoek, "Secure Applications Need Flexible Operating Systems,"6th Workshop on Hot Topics in Operating Systems (HotOS–VI), May 5–6, 1997, http://www.eecs.harvard.edu/hotos/.

Neuman et al., "Kerberos: An Authentication Service for Computer Networks," *IEEE Communications magazine*, pp. 33–38, Sep. 1, 1994.

copy of International Search Report in Corresponding PCT application No. PCT/US99/12914.

Anonymous, "Apache suEXEC Support," (describes the Apache HTTP Server Version 1.3 dating from Jun. 5, 1998 as documented in Written Opinion for PCT Application No. PCT/US99/12912), <http://www.apache.org/docs/suexec.html>,printed Jul. 24, 2000.

Anonymous, "Apache Virtual Host documentation," (describes the Apache HTTP Server Version 1.3 dating from Jun. 5, 1998 as documented in Written Opinion for PCT Application No. PCT/US99/12912), <http://www.apache.org/docs/vhosts/index.html>,printed Jul. 24, 2000.

Bell Telephone Laboratories Incorporated, UNIX™Time–Sharing System: *UNIX Programmer's Manual, 7$^{th}$ Edition*, vol. 1, CHMOD(1), Su(1), Exec(2) (Jan. 1979).

Fritzinger et al., "Java Security,"1996,<http://java.sun.com/security/whitepaper.txt>.

Fritzinger et al., "Java Security,"1996,<http://java.sun.com/security/whitepaper.ps>.

* cited by examiner

LEAST PRIVILEGE VIA RESTRICTED TOKENS

FIELD OF THE INVENTION

The invention relates generally to computer systems, and more particularly to improvements in security for computer systems.

BACKGROUND OF THE INVENTION

In computing, if a task is performed by a user having more privileges than necessary to do that task, there is an increased risk that the user inadvertently will do some harm to computer resources. By way of example, if a set of files can only be deleted by a user with administrator privileges, then an administrator may inadvertently delete those files when performing another task that does not need to be accomplished by an administrator. If the administrator had been a user having lesser privileges, then the intended task could still have been performed but the inadvertent deletion would not have been allowed.

Thus, a recognized goal in computer security is the concept of least privilege, in which a user performing a task should run with the absolute minimum privileges (or identities, such as group memberships) necessary to do that task. However, there is no convenient way to add and remove a user's access rights and privileges. For example, in the Windows NT operating system, when the user logs on, an access token is built for the user based on the user's credentials. The access token determines the access rights and privileges that the user will have for that session. As a result, the user will have those privileges for each task attempted during that session and for any future sessions. While ideally an administrator can set up multiple identities and log-on as a different user with different rights for each task, this is too burdensome and too complicated. Moreover, since there is no automatic enforcement, even a safety-conscious administrator is unlikely to log off and log back on with a new identity each time a different task is performed, simply to avoid the possibility of doing some unintended action.

In short, there is simply not a convenient way to change privilege levels or access rights, nor a way to further restrict privileges at a granularity finer than that created by the domain administrator. Other operating systems have similar problems that make running with least privileges an ideal that is rarely, if ever, practiced.

SUMMARY OF THE INVENTION

Briefly, the present invention provides a mechanism to enforce least privilege, or in some way reduced access, via restricted access tokens. Restricted access tokens enable a security mechanism to determine whether a process has access to a resource based on a modified, restricted version of an existing access token. The restricted token is based on an existing token, and has less access than that token. A restricted token may be created from an existing (parent) token by changing an attribute of one or more security identifiers that allow access in the parent token to a setting that denies access in the restricted token and/or removing one or more privileges from the restricted token that are present in the parent token. In addition, restricted security identifiers may be placed in the restricted token.

In use, a process is associated with a restricted token, and when the restricted process attempts to perform an action on a resource, a kernel mode security mechanism first compares the user-based security identifiers and the intended type of action against a list of identifiers and actions associated with the resource. If there are no restricted security identifiers in the restricted token, access is determined by the result of this first comparison. If there are restricted security identifiers in the restricted token, a second access check for this action compares the restricted security identifiers against the list of identifiers and actions associated with the resource. With a token having restricted security identifiers, the process is granted access to the resource only if both the first and second access checks pass.

Application programs may have restriction information stored in association therewith. When the application is launched, a restricted token is created for that application based on the restriction information. In this manner, reduced access is automatically enforced for that application. Applications may be divided into different access levels such as privileged and non-privileged portions, thereby automatically restricting the actions a user can perform via that application. Also, the system may enforce running with reduced access by running user processes with a restricted token, and then requiring a definite action by the user to specifically override actions that are restricted by temporarily running with the user's normal token.

Other advantages will become apparent from the following detailed description when taken in conjunction with the drawings, in which:

DETAILED DESCRIPTION

Exemplary Operating Environment

Figure 1:
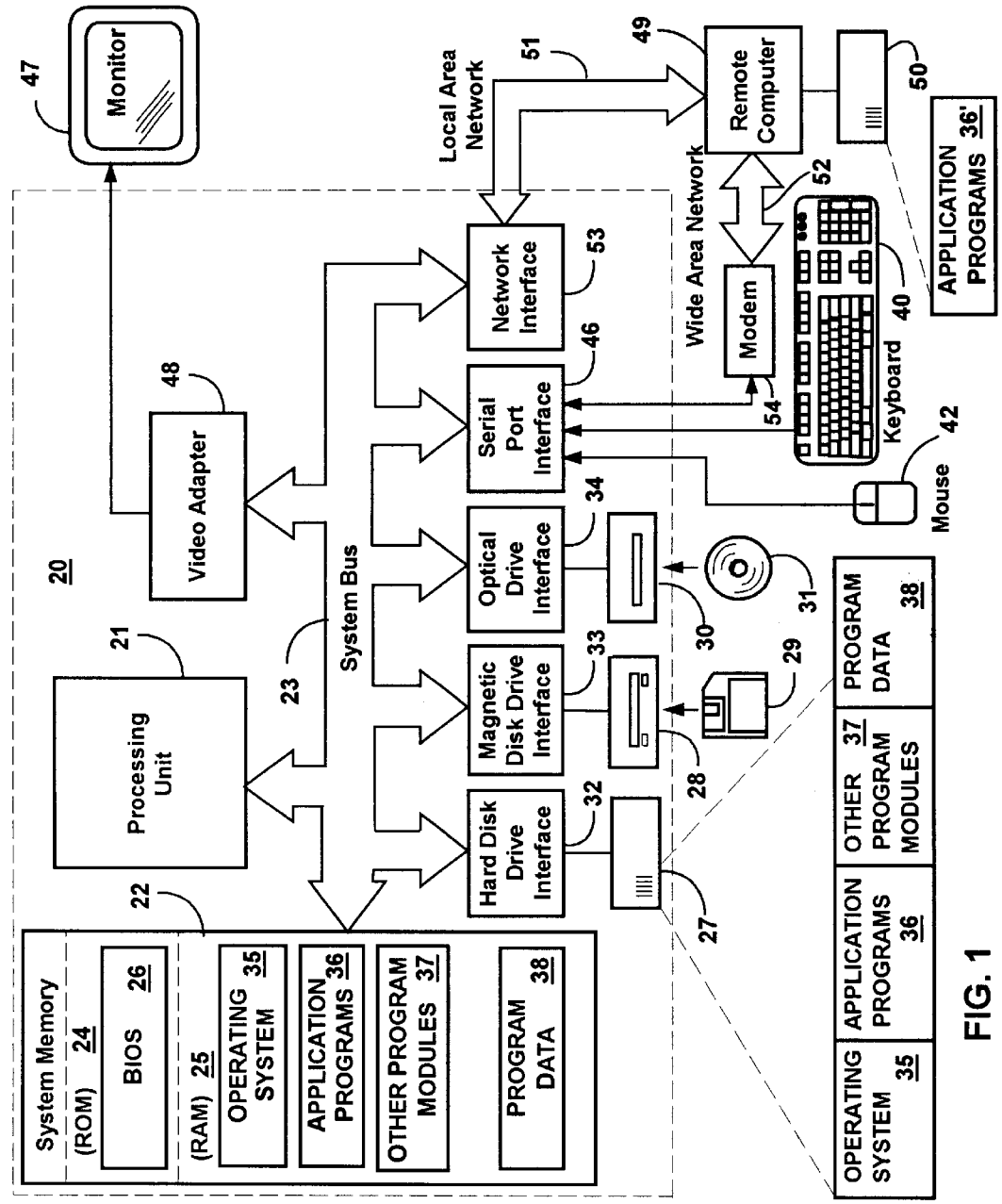
FIG. 1 is a block diagram representing a computer system into the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows NT), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The General Security Model

The preferred security model of the present invention is described herein with reference to the Windows NT security model. Notwithstanding, there is no intention to limit the present invention to the Windows NT operating system, but on the contrary, the present invention is intended to operate with and provide benefits with any mechanism that performs security checks at the operating system level.

In general, in the Windows NT operating system, a user performs tasks by accessing the system's resources via processes (and their threads). For purposes of simplicity herein, a process and its threads will be considered conceptually equivalent, and will thus hereinafter simply be referred to as a process. Also, the system's resources, including files, shared memory and physical devices, which in Windows NT are represented by objects, will be ordinarily referred to as either resources or objects herein.

When a user logs on to the Windows NT operating system and is authenticated, a security context is set up for that user, which includes building an access token 60. As shown in the left portion of FIG. 2, a conventional user-based access token 60 includes a UserAndGroups field 62 including a security identifier (Security ID, or SID) 64 based on the user's credentials and one or more group IDs 66 identifying groups (e.g., within an organization) to which that user belongs. The token 60 also includes a privileges field 68 listing any privileges assigned to the user. For example, one such privilege may give an administrative-level user the ability to set the system clock through a particular application programming interface (API). Note that privileges override access control checks, described below, that are otherwise performed before granting access to an object.

Figure 3:
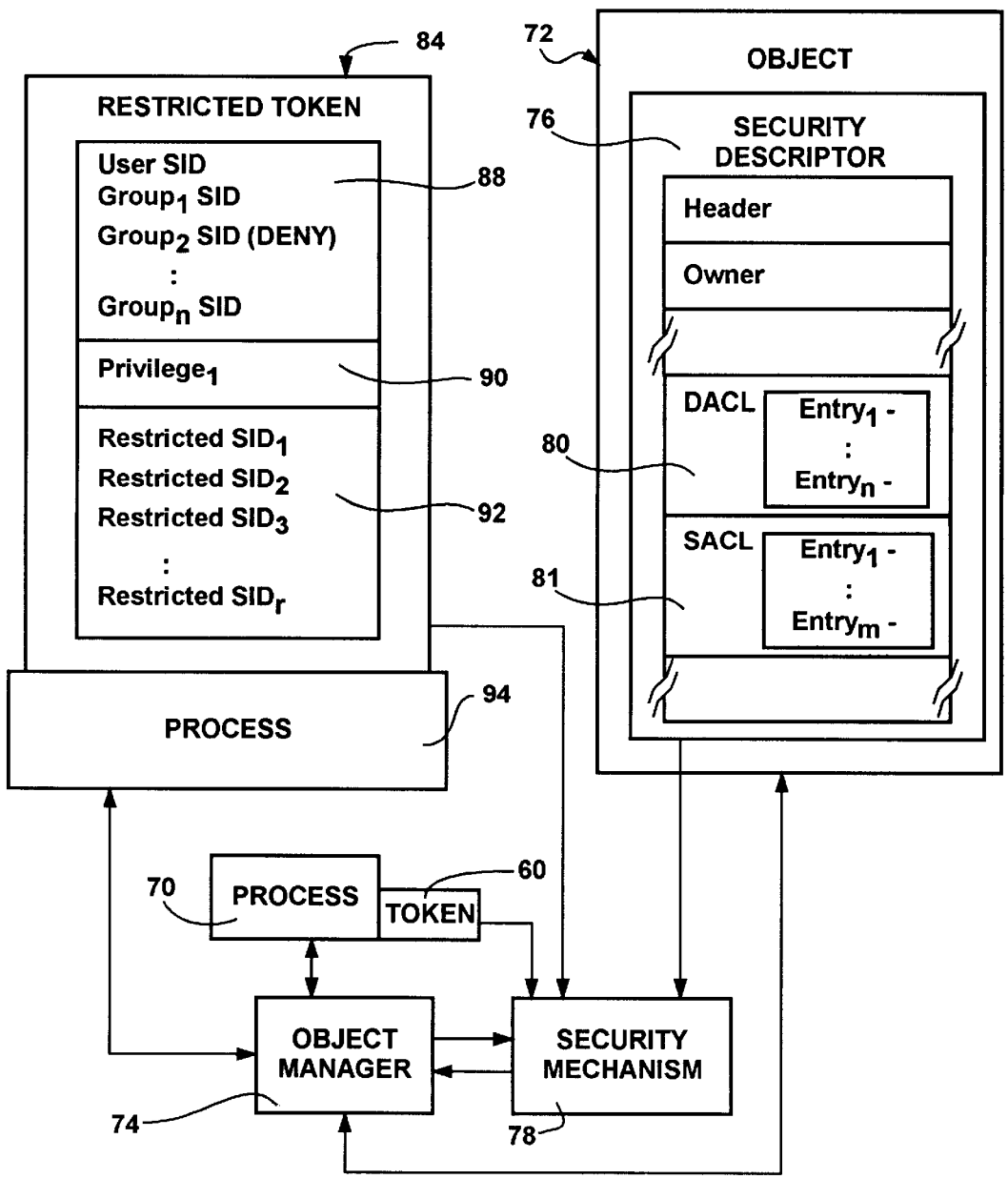
FIG. 3 is a block diagram generally representing the various components for determining whether a process may access a resource.

As will be described in more detail below and as generally represented in FIG. 3, a process 70 desiring access to an object 72 specifies the type of access it desires (e.g., obtain read/write access to a file object) and at the kernel level provides its associated token 60 to an object manager 74. The object 72 has a kernel level security descriptor 76 associated therewith, and the object manager 74 provides the security descriptor 76 and the token 60 to a security mechanism 78. The contents of the security descriptor 76 are typically determined by the owner (e.g., creator) of the object, and generally comprise a (discretionary) access control list (ACL) 80 of access control entries, and for each entry, one or more access rights (allowed or denied actions) corresponding to that entry. Each entry comprises a type (deny or allow) indicator, flags, a security identifier (SID) and access rights in the form of a bitmask wherein each bit corresponds to a permission (e.g., one bit for read access, one for write and so on). The security mechanism 78 compares the security IDs in the token 60 along with the type of action or actions requested by the process 70 against the entries in the ACL 80. If a match is found with an allowed user or group, and the type of access desired is allowable for the user or group, a handle to the object 72 is returned to the process 70, otherwise access is denied.

By way of example, a user with a token identifying the user as a member of the "Accounting" group may wish to access a particular file object with read and write access. If the file object has the "Accounting" group identifier of type allow in an entry of its ACL 80, and the group has rights enabling read and write access, a handle granting read and write access is returned, otherwise access is denied. Note that for efficiency reasons, the security-check is performed only when the process 70 first attempts to access the object 72 (create or open), and thus the handle to the object stores the type of access information so as to limit the actions that can be performed therethrough.

The security descriptor 76 also includes a system ACL, or SACL 81, which comprises entries of type audit corresponding to client actions that are to be audited. Flags in each entry indicate whether the audit is monitoring successful or failed operations, and a bitmask in the entry indicates the type of operations that are to be audited. A security ID in the entry indicates the user or group being audited. For example, consider a situation wherein a particular group is being audited so as to determine whenever a member of that group that does not have write access to a file object attempts to write to that file. The SACL 81 for that file object includes an audit entry having the group security identifier therein along with an appropriately set fail flag and write access bit. Whenever a client belonging to that particular group attempts to write to the file object and fails, the operation is logged.

Note that the ACL 80 may contain one or more identifiers that are marked for denying users of groups access (as to all rights or selected rights) rather than granting access thereto. For example, one entry listed in the ACL 80 may otherwise allow members of "Group$_3$" access to the object 72, but another entry in the ACL 80 may specifically deny "Group$_{24}$" all access. If the token 60 includes the "Group$_{24}$" security ID, access will be denied regardless of the presence of the "Group$_3$" security ID. Of course to function properly, the security check is arranged so as to not allow access via the "Group$_3$" entry before checking the "DENY ALL" status of the Group$_{24}$ entry, such as by placing all DENY entries at the front of the ACL 80. As can be appreciated, this arrangement provides for improved efficiency, as one or more isolated members of a group may be separately excluded in the ACL 80 rather than having to individually list each of the remaining members of a group to allow their access.

Note that instead of specifying a type of access, a caller may request a MAXIMUM_ALLOWED access, whereby an algorithm determines the maximum type of access allowed, based on the normal UserAndGroups list versus each of the entries in the ACL 80. More particularly, the algorithm walks down the list of identifiers accumulating the rights for a given user (i.e., OR-ing the various bitmaps). Once the rights are accumulated, the user is given the accumulated rights. However, if during the walkthrough a deny entry is found that matches a user or group identifier and the requested rights, access is denied.

Restricted Tokens

A restricted token is created from an existing access token (either restricted or unrestricted) as described below. As also described below, if the restricted token includes any restricted security IDs, the token is subject to an additional access check wherein the restricted security IDs are compared against the entries in the object's ACL. Restricted tokens are also described in the copending U.S. Patent Application entitled "Security Model Using Restricted Tokens" assigned to the same assignee as the present invention, filed concurrently herewith and incorporated by reference in its entirety.

The primary use of a restricted token is for a process to create a new process with a restricted version of its own token. The restricted process is then limited in the actions it may perform on resources. For example, a file object resource may have in its ACL a single restricted SID identifying the Microsoft Word application program, such that only restricted processes having the same Microsoft Word restricted SID in its associated restricted token may access the file object. Then, for example, untrusted code such as downloaded via a browser could be run in a restricted process that did not have the Microsoft Word restricted Security ID in its restricted token, preventing that code's access to the file object.

For security reasons, creating a process with a different token normally requires a privilege known as the SeAssignPrimaryToken privilege. However, to allow processes to be associated with restricted tokens, process management allows one process with sufficient access to another process to modify its primary token to a restricted token, if the restricted token is derived from the primary token. By comparing the ParentTokenId of the new process's token with the TokenId of the existing process' token, the operating system 35 may ensure that the process is only creating a restricted version of itself.

A restricted token 84 has less access than its parent token, and may, for example, prevent access to an object based on the type of process (as well as the user or group) that is attempting to access the object, instead of simply allowing or denying access solely based on the user or group information. A restricted token may also not allow access via one or more user or group security IDs specially marked as "USE_FOR_DENY_ONLY," even though the parent token allows access via those SIDs, and/or may have privileges removed that are present in the parent token.

Thus, one way in which to reduce access is to change an attribute of one or more user and/or group security identifiers in a restricted token so as to be unable to allow access, rather than grant access therewith. Security IDs marked USE_FOR_DENY_ONLY are effectively ignored for purposes of granting access, however, an ACL that has a "DENY" entry for that security ID will still cause access to be denied. By way of example, if the Group$_2$ security ID in the restricted token 84 (FIG. 3) is marked USE_FOR_DENY_ONLY, when the user's process attempts to access an object 72 having the ACL 80 that lists Group$_2$ as allowed, that entry is effectively ignored and the process will have to gain access by some other security ID. However, if the ACL 80 includes an entry listing Group$_2$ as DENY with respect to the requested type of action, then once tested, no access will be granted regardless of other security IDs.

Note that access to objects cannot be safely reduced by simply removing a security ID from a user's token, since that security ID may be marked as "DENY" in the ACL of some objects, whereby removing that identifier would grant rather than deny access to those objects. Thus, the present invention allows a SID's attributes to be modified to USE_FOR_DENY_ONLY in a restricted token. Moreover, no mechanism is provided to turn off this USE_FOR_DENY_ONLY security check.

Another way to reduce access in a restricted token is to remove one or more privileges relative to the parent token. For example, a user having a normal token with administrative privileges may set up a system such that unless that user specifically informs the system otherwise, the user's processes will run with a restricted token having no privileges. As can be appreciated, and as described in more detail below, this prevents inadvertent errors that may occur when the user is not intentionally acting in an administrative capacity. Similarly, programs may be developed to run in different modes depending on a user's privileges, whereby an administrative-level user has to run the program with administrative privileges to perform some operations, but operate with reduced privileges to perform more basic operations. Again, this helps to prevent serious errors that might otherwise occur when such a user is simply attempting to perform normal operations but is running with elevated privileges.

Yet another way to reduce a token's access is to add restricted security IDs thereto. Restricted security IDs are numbers representing processes, resource operations and the like, made unique such as by appending a GUID or a number generated via a cryptographic hash or mapping to a GUID or a cryptographic hash, and may include information to distinguish these Security IDs from other Security IDs. Although not necessary to the invention, for convenience, various application programming interfaces (APIs) are provided to interface applications and users with Security IDs, such as to accomplish a GUID to Security ID conversion, represent the Security IDs in human readable form, and so on.

In addition to restricting access to a resource based on the application (process) requesting access, specific Security IDs may be developed based on likely restricted uses of a resource. By way of example, a Security ID such as "USE_WINDOWS" would be placed in the default ACLs of graphical user interface objects to allow access thereto only by a process having a corresponding SID in its restricted token. Similarly, the default ACL of a printer object may include a "USE_PRINTING" SID in its default ACL, so that a process could create a restricted process with only this Security ID listed in its restricted token, whereby the restricted process would be able to access the printer but no other resource. As can be appreciated, numerous other Security IDs for accessing other resources may be implemented.

As shown in FIG. 3, restricted security IDs are placed in a special field 82 of a restricted token 84, such as for identifying a process that is requesting an action. As described in more detail below, by requiring that both at least one user (or group) security ID and at least one restricted security ID be granted access to an object, an object may selectively grant access based on a requesting process (as well as a user or group). For example, an object such as a file object may allow Microsoft Word, Microsoft Excel or Windows Explorer processes to access it, but deny access to any other process. Moreover, each of the allowed processes may be granted different access rights.

The design provides for significant flexibility and granularity within the context of a user to control what different processes are allowed to do. One expected usage model for these features includes a distinction between trusted applications and untrusted applications. Note that the term "application" is used in a generic sense to describe any piece of code that may be executed in "user mode" under a given security context. For example, an application such as Microsoft Word may be launched from an ActiveX control, which may be loaded into an existing process and executed. Applications which launch other applications, such as Microsoft's Internet Explorer, may introduce a "trust model" using this infrastructure.

By way of example, an application such as Internet Explorer can use restricted tokens to execute untrusted executable code under different processes, and control what those processes can do within the user's overall access rights and privileges. To this end, the Internet Explorer application creates a restricted token from its own token, and determines which restricted security IDs will be placed in the restricted token. Then, the untrusted executable code is restricted to accessing only those objects that the restricted context may access.

Moreover, entries corresponding to restricted SIDs and other restrictions may be placed in a field of the SACL 81 for auditing purposes. For example, the SACL of a resource may be set up to audit each time that Internet Explorer program attempts read or write access of that resource, and/or the use of SIDs marked USE_FOR_DENY_ONLY may be audited. For purposes of simplicity, auditing will not be described in detail hereinafter, however it can be readily appreciated that the concepts described with respect to access control via restricted SIDs are applicable to auditing operations.

To create a restricted token from an existing token, an application programming interface (API) is provided, named NtFilterToken, as set forth below:

```
NTSTATUS
NtFilterToken (
    IN HANDLE ExistingTokenHandle,
    IN ULONG Flags,
    IN PTOKEN_GROUPS SidsToDisable OPTIONAL,
    IN PTOKEN_PRIVILEGES PrivilegesToDelete OPTIONAL,
    IN PTOKEN_GROUPS RestrictingSids OPTIONAL,
    OUT PHANDLE NewTokenHandle
    );
```

The NtFilterToken API is wrapped under a Win32 API named CreateRestrictedToken, further set forth below:

```
WINADVAPI
BOOL
APIENTRY
CreateRestrictedToken (
    IN HANDLE ExistingTokenHandle,
    IN DWORD Flags,
    IN DWORD DisableSidCount,
    IN PSID_AND_ATTRIBUTES SidsToDisable OPTIONAL,
    IN DWORD DeletePrivilegeCount,
    IN PLUID_AND_ATTRIBUTES PrivilegesToDelete
        OPTIONAL,
    IN DWORD RestrictedSidCount,
    IN PSID_AND_ATTRIBUTES SidsToRestrict OPTIONAL,
    OUT PHANDLE NewTokenHandle
    );
```

Figure 2:
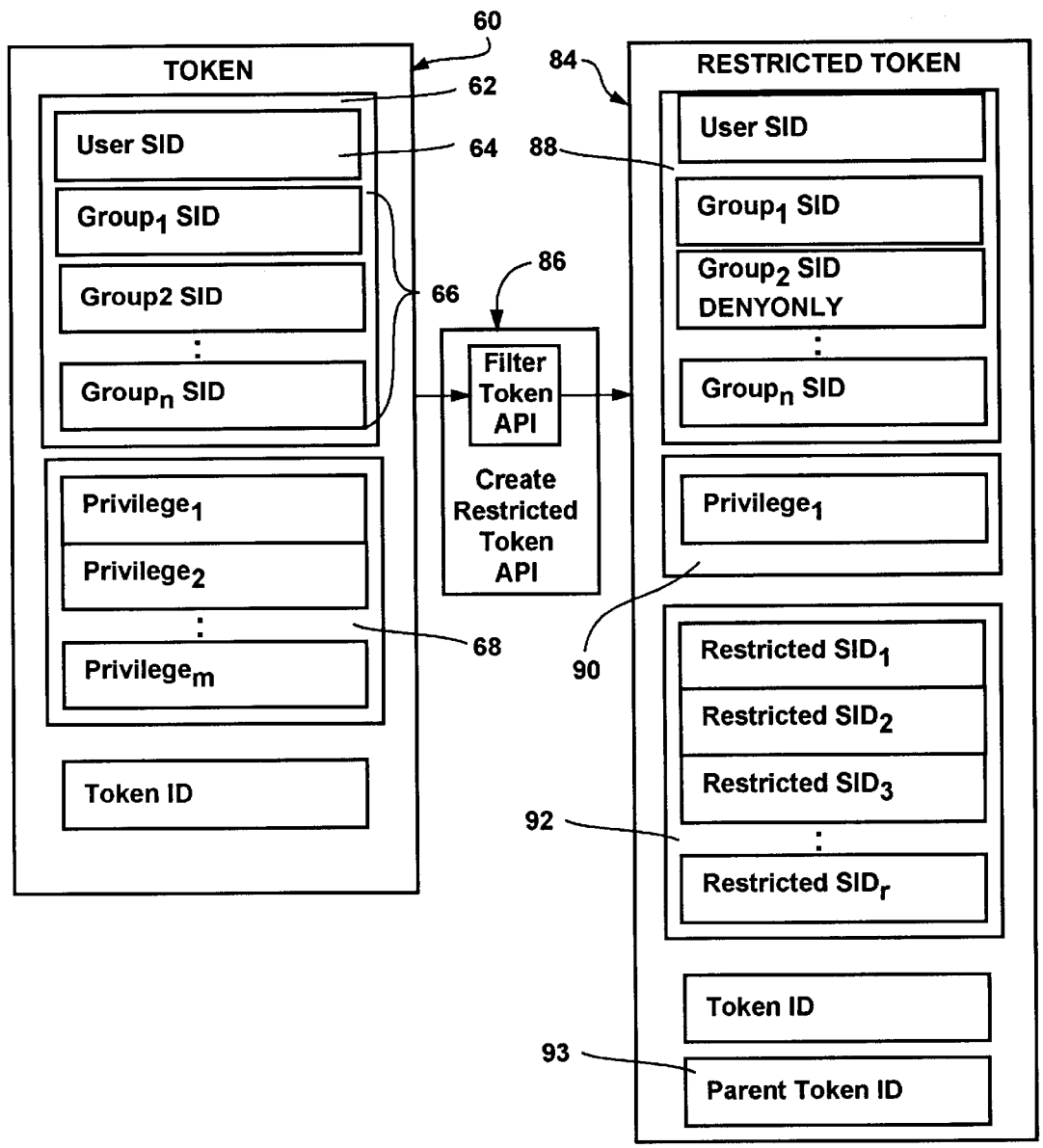
FIG. 2 is a block diagram generally representing the creation of a restricted token from an existing token.
Figure 4A:
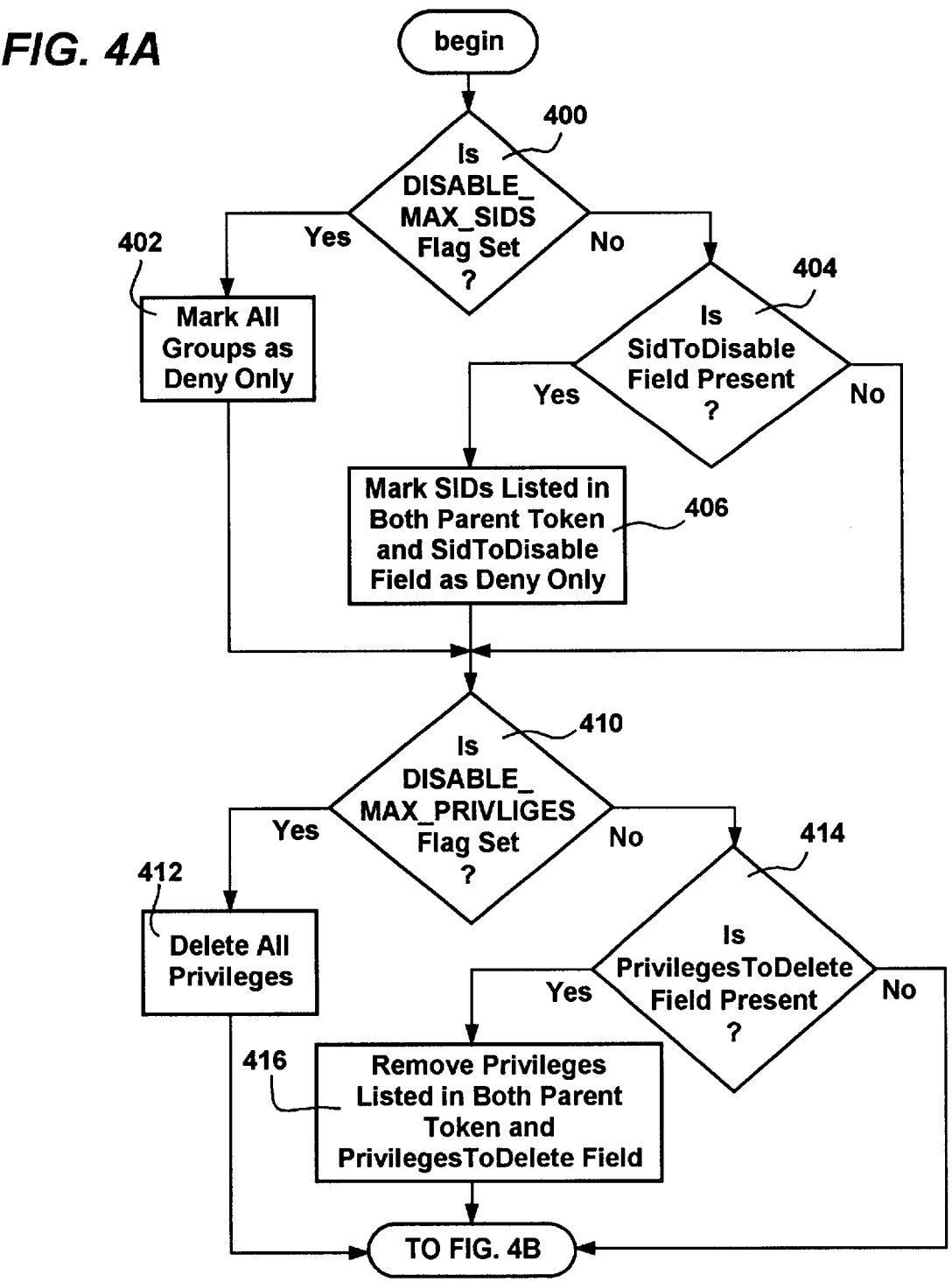
FIGS. 4A–4B comprise a flow diagram representing the general steps taken to create a restricted token from an existing token.
Figure 4B:
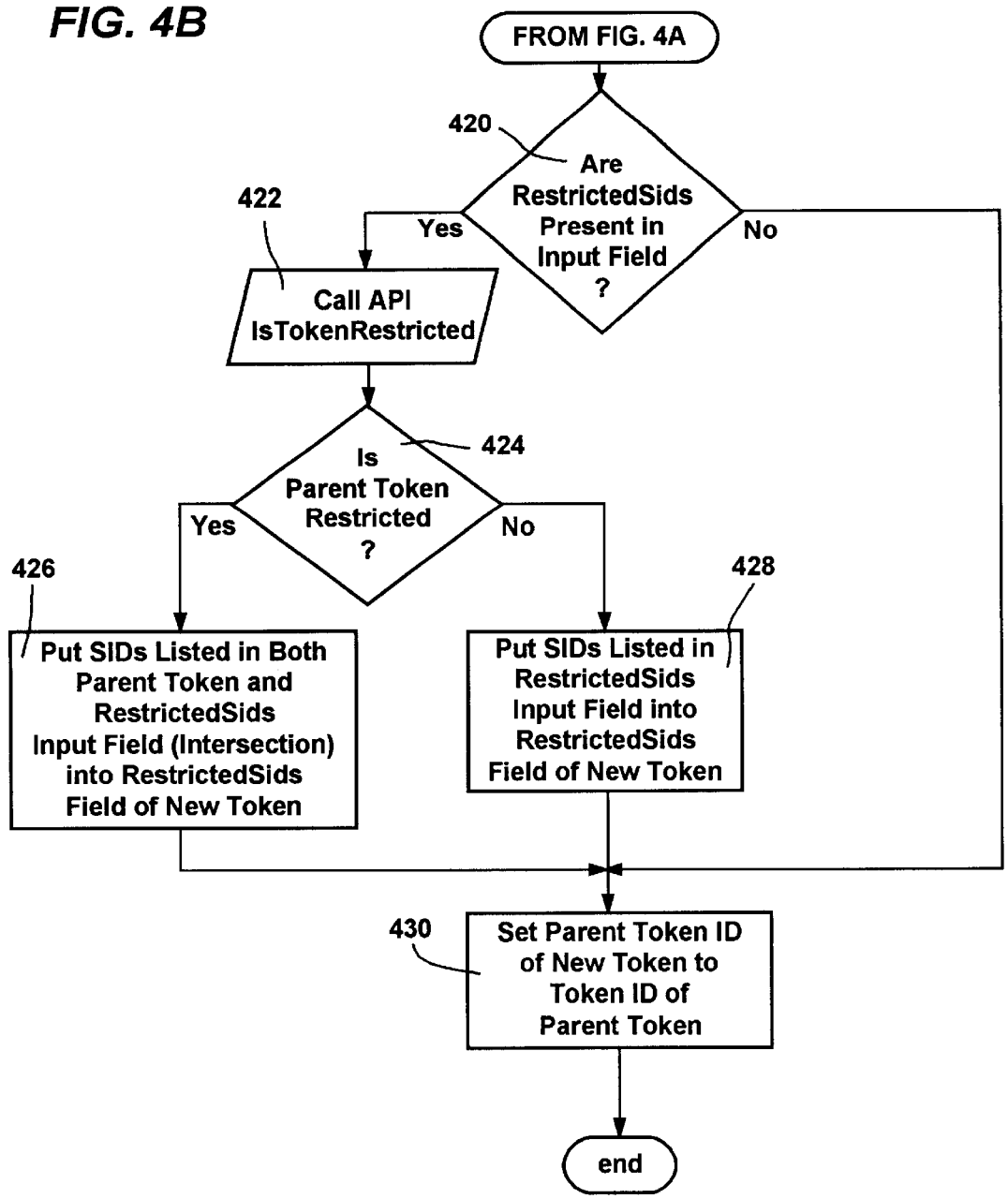

As represented in FIGS. 2 and 4A–4B, these APIs 86 work in conjunction to take an existing token 60, either restricted or unrestricted, and create a modified (restricted) token 84 therefrom. The structure of a restricted token, which contains the identification information about an instance of a logged-on user, includes three new fields, ParentTokenId, RestrictedSidCount and RestrictedSids (shown in boldface below):

```
Typedef struct _TOKEN {
    TOKEN_SOURCE TokenSource;           // Ro: 16-Bytes
    LUID TokenId;                        // Ro: 8-Bytes
    LUID AuthenticationId;               // Ro: 8-Bytes
    LUID ParentTokenId;                  // Ro: 8-Bytes
    LARGE_INTEGER ExpirationTime;        // Ro: 8-Bytes
    LUID ModifiedId;                     // Wr: 8-Bytes
    ULONG UserAndGroupCount;             // Ro: 4-Bytes
    ULONG RestrictedSidCount;            // Ro: 4-Bytes
    ULONG PrivilegeCount;                // Ro: 4-Bytes
    ULQNG VariableLength;                // Ro: 4-Bytes
    ULONG DynamicCharged;                // Ro: 4-Bytes
    ULONG DynamicAvailable;              // Wr: 4-Bytes (Mod)
    ULONG DefaultOwnerIndex;             // Wr: 4-Bytes (Mod)
    PSID_AND_ATTRIBUTES UserAndGroups;   // Wr: 4-Bytes (Mod)
    PSID_AND_ATTRIBUTES RestrictedSids;  // Ro: 4-Bytes
    PSID PrimaryGroup;                   // Wr: 4-Bytes (Mod)
    PLUID_AND_ATTRIBUTES Privileges;     // Wr: 4-Bytes (Mod)
    PULONG DynamicPart;                  // Wr: 4-Bytes (Mod)
    PACL DefaultDacl;                    // Wr: 4-Bytes (Mod)
    TOKEN_TYPE TokenType;                // Ro: 1-Byte
    SECURITY_IMPERSONATION_LEVEL         // Ro: 1-Byte
        ImpersonationLevel;
    UCHAR TokenFlags;                    // Ro: 4-Bytes
    BOOLEAN TokenInUse;                  // Wr: 1-Byte
    PSECURITY_TOKEN_PROXY_DATA           // Ro: 4-Bytes
        ProxyData;
    PSECURITY_TOKEN_AUDIT_DATA           // Ro: 4-Bytes
        AuditData;
    ULONG VariablePart;                  // Wr: 4-Bytes (Mod)
} TOKEN, * PTOKEN;
```

Note that when a normal (non-restricted) token is now created, via a CreateToken API, the RestrictedSids field is empty, as is the ParentTokenId field.

To create a restricted token 84, a process calls the CreateRestrictedToken API with appropriate flag settings and/or information in the input fields, which in turn invokes the NtFilterToken API. As represented beginning at step 400 of FIG. 4A, the NtFilterToken API checks to see if a flag named DISABLE_MAX_SIDS is set, which indicates that all Security IDs for groups in the new, restricted token 84 should be marked as USE FOR DENY ONLY. The flag provides a convenient way to restrict the (possibly many) groups in a token without needing to individually identify each of the groups. If the flag is set, step 400 branches to step 402 which sets a bit indicating USE_FOR_DENY_ONLY on each of the group security IDs in the new token 84.

If the DISABLE_MAX_SIDS flag is not set, then step 400 branches to step 404 to test if any security IDs are individually listed in a SidsToDisable Field of the NtFilterToken API. As shown at step 404 of FIG. 4A, when the optional SidsToDisable input field is present, at step 406, any Security IDs listed therein that are also present in the UserAndGroups field 62 of the parent token 60 are individually marked as USE_FOR_DENY_ONLY in the UserAndGroups field 88 of the new restricted token 84. As described above, such Security IDs can only be used to deny access and cannot be used to grant access, and moreover, cannot later be removed or enabled. Thus, in the example shown in FIG. 2, the Group$_2$ security ID is marked as USE FOR_DENY_ONLY in the restricted token 84 by having specified the Group$_2$ security ID in the SidsToDisable input field of the NtFilterToken API 86.

The filter process then continues to step 410 of FIG. 4A, wherein a flag named DISABLE_MAX_PRIVILEGES is tested. This flag may be similarly set as a convenient shortcut to indicate that all privileges in the new, restricted token 84 should be removed. If set, step 410 branches to step 412 which deletes all privileges from the new token 84.

If the flag is not set, step 410 branches to step 414 wherein the optional PrivilegesToDelete field is examined. If present when the NtFilterToken API 86 is called, then at step 416, any privileges listed in this input field that are also present in the privileges field 68 of the existing token 60 are individually removed from the privileges field 90 of the new token 84. In the example shown in FIG. 2, the privileges shown as "Privilege$_2$" to "Privilege$_m$" have been removed from the privileges field 90 of the new token 84 by having specified those privileges in the PrivilegesToDelete input field of the NtFilterToken API 86. In keeping with one aspect of the present invention, as described above, this provides the ability to reduce the privileges available in a token. The process continues to step 420 of FIG. 4B. When creating a restricted token 84, if SIDs are present in the RestrictingSids input field at step 420, then a determination is made as to whether the parent token is a normal token or is itself a restricted token having restricted SIDs. An API, IsTokenRestricted is called at step 422, and resolves this question by querying (via the NtQueryInformationToken API) the RestrictingSids field of the parent token to see if it is not NULL, whereby if not NULL, the parent token is a restricted token and the API returns a TRUE. If the test is not satisfied, the parent token is a normal token and the API returns a FALSE. Note that for purposes of the subsequent steps 426 or 428, a parent token that is restricted but does not have restricted SIDs (i.e., by having privileges removed and/or USE_FOR_DENY_ONLY SIDs) may be treated as being not restricted.

At step 424, if the parent token is restricted, step 424 branches to step 426 wherein any security IDs that are in both the parent token's restricted Security ID field and the API's restricted Security ID input list are put into the restricted Security ID field 92 of the new token 84. Requiring restricted security IDs to be common to both lists prevents a restricted execution context from adding more security IDs to the restricted Security ID field 92, an event which would effectively increase rather than decrease access. Similarly, if none are common at step 426, any token created still has to be restricted without increasing the access thereof, such as by leaving at least one restricted SID from the original token in the new token. Otherwise, an empty restricted SIDs field in the new token would indicate that the token is not restricted, an event which would effectively increase rather than decrease access.

Alternatively, if at step 424 the parent token is determined to be a normal token, then at step 428 the RestrictingSids field 92 of the new token 84 is set to those listed in the input field. Note that although this adds security IDs, access is actually decreased since a token having restricted SIDs is subject to a secondary access test, as described in more detail below.

Lastly, step 430 is also executed, whereby the ParentTokenId 93 in the new token 84 is set to the TokenId of the existing (parent) token. This provides the operating system with the option of later allowing a process to use a restricted version of its token in places that would not normally be allowed except to the parent token.

Figure 5:
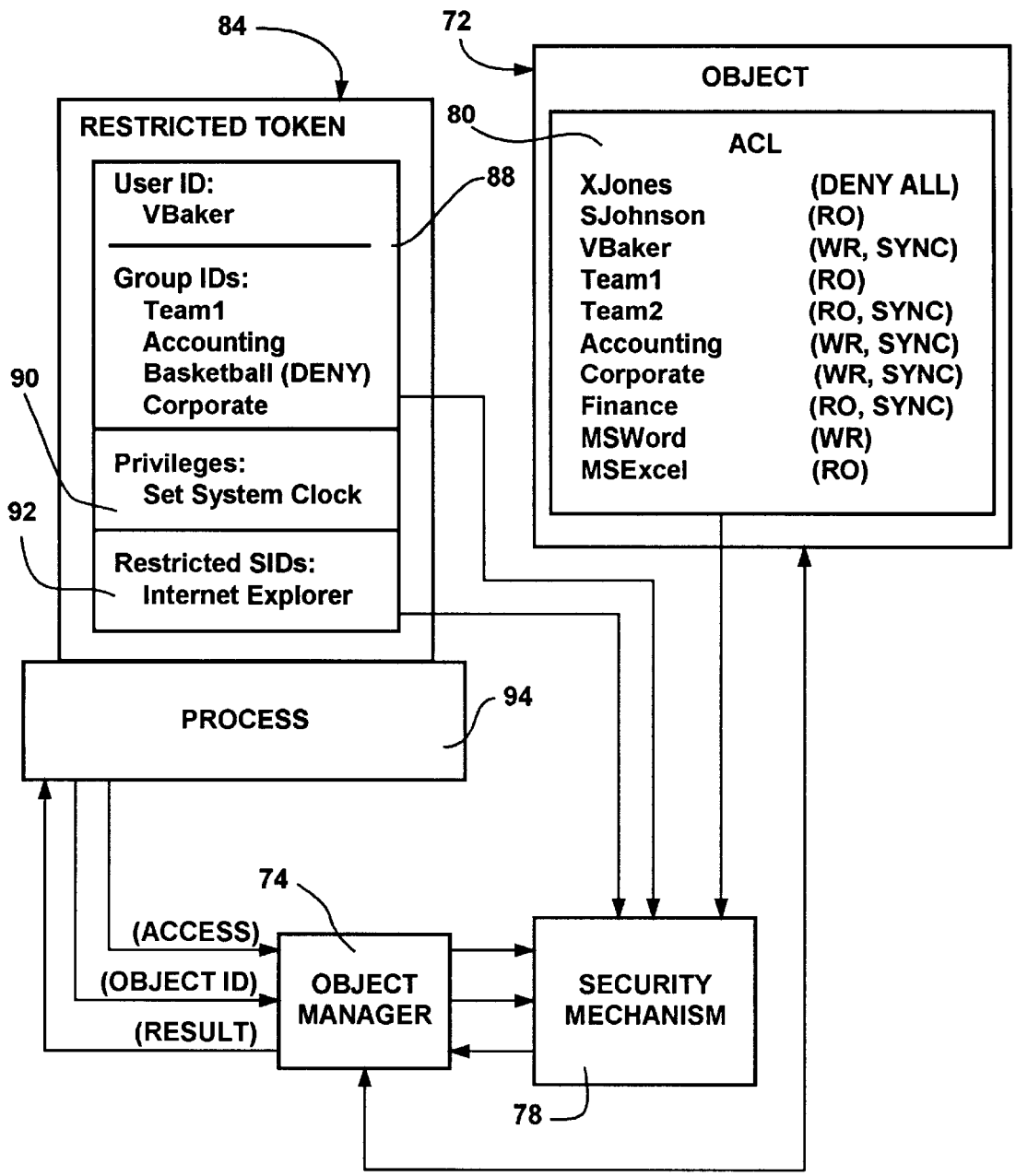
FIG. 5 is a block diagram generally representing a process having a restricted token associated therewith attempting to access a resource.
Figure 6:
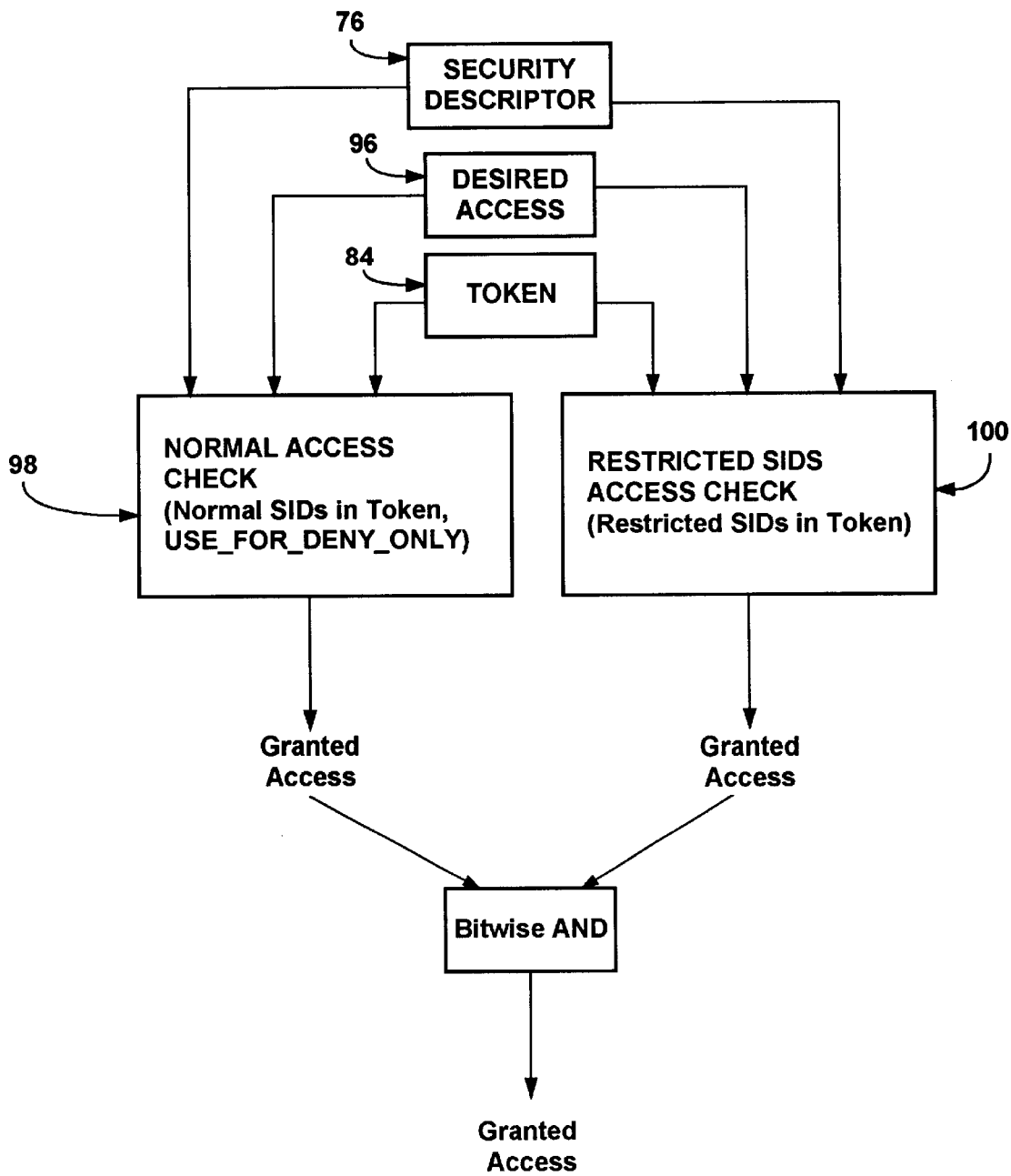
FIG. 6 is a block diagram generally representing the logic for determining access to an object of a process having a restricted token associated therewith.
Figure 7:
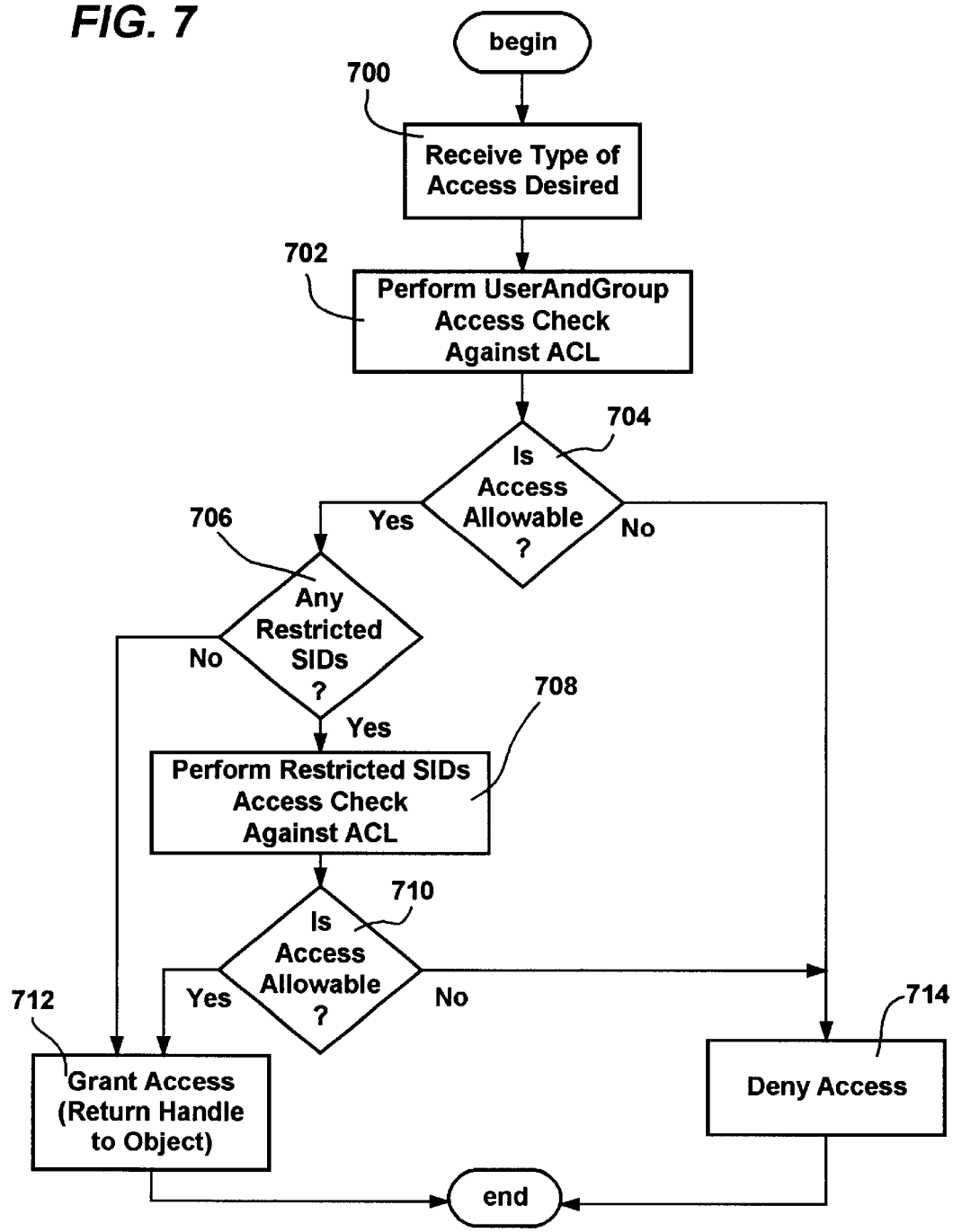
FIG. 7 is a flow diagram representing the general steps taken when determining whether to grant a process access to a resource.

Turning an explanation of the operation of the invention with particular reference to FIG. 5–7, as represented in FIG. 5, a restricted process 94 has been created and is attempting to open a file object 70 with read/write access. In the security descriptor of the object 72, the ACL 80 has a number of security IDs listed therein along with the type of access allowed for each ID, wherein "RO" indicates that read only access is allowed, "WR" indicates read/write access and "SYNC" indicates that synchronization access is allowed. Note that "XJones" is specifically denied access to the object 72, even if "XJones" would otherwise be allowed access through membership in an allowed group. Moreover, the process 94 having this token 84 associated therewith will not be allowed to access any object via the "Basketball" security ID in the token84, because this entry is marked "DENY" (i.e., USE_FOR_DENY_ONLY).

For purposes of security, restricted security contexts are primarily implemented in the Windows NT kernel. To attempt to access the object 72, the process 94 provides the object manager 74 with information identifying the object to which access is desired along with the type of access desired, (FIG. 7, step 700). In response, as represented at step 702, the object manager 74 works in conjunction with the security mechanism 78 to compare the user and group security IDs listed in the token 84 (associated with the process 94) against the entries in the ACL 80, to determine if the desired access should be granted or denied.

As generally represented at step 704, if access is not allowed for the listed user or groups, the security check denies access at step 714. However, if the result of the user and group portion of the access check indicates allowable access at step 704, the security process branches to step 706 to determine if the restricted token 84 has any restricted security IDs. If not, there are no additional restrictions, whereby the access check is complete and access is granted at step 712 (a handle to the object is returned) based solely on user and group access. In this manner, a normal token is essentially checked as before. However, if the token includes restricted security IDs as determined by step 706, then a secondary access check is performed at step 708 by comparing the restricted security IDs against the entries in the ACL 80. If this secondary access test allows access at step 710, access to the object is granted at step 712. If not, access is denied at step 714.

As logically represented in FIG. 6, a two-part test is thus performed whenever restricted Security IDs are present in the token 84. Considering the security IDs in the token 84 and the desired access bits 96 against the security descriptor of the object 72, both the normal access test and (bitwise AND) the restricted security IDs access test must grant access in order for the process to be granted access to the object. Although not necessary to the invention, as described above, the normal access test proceeds first, and if access is denied, no further testing is necessary. Moreover, it should be noted that a token may include multiple sets of restricted SIDs, with a Boolean expression in the ACL covering the evaluation of those SIDs. For example, to grant access to a resource, an ACL may specify that "access must be granted to set A OR (set B AND set C)." Note that access may be denied either because no security ID (or set of SIDs) in the token properly matched an identifier in the ACL, or because an ACL entry specifically denied access to the token based on a security identifier therein.

Thus, in the example shown in FIG. 5, no access to the object 72 will be granted to the process 94 because the only Restricted SID in the token 84 (field 92) identifies "Internet Explorer," while there is no counterpart restricted SID in the object's ACL 80. Although the user had the right to access the object via a process running with a normal token, the process 94 was restricted so as to only be able to access objects having an "Internet Explorer" SID (non-DENY) in their ACLs.

Note that instead of specifying a type of access, the caller may have specified MAXIMUM_ALLOWED access, whereby as described above, an algorithm walks through the ACL 80 determining the maximum access. With restricted tokens, if any type of user or group access at all is granted, the type or types of access rights allowable following the user and groups run is specified as the desired access for the second run, which checks the RestrictedSids list. In this way, a restricted token is certain to be granted less than or equal to access than the normal token.

Lastly, it should be noted that the security model of the present invention may be used in conjunction with other security models. For example, capability-based security models residing on top of an operating system may be used above the operating system-level security model of the present invention. Indeed, capabilities may be implemented as restricted SIDs.

Least Privilege Via Restricted Tokens

In general, the present invention is directed to the system's automatic enforcement of a user running with reduced access rights and/or privileges. For purposes of simplicity, as used hereinafter, the terms "access" or "privileges," when used in the context of the ability of a process to use a resource, refers to either privileges or security identifiers, or some combination of both. Thus, a restricted token has reduced "access" with respect to its parent token's access, either by having one or more privileges removed and/or having SIDs set to USE_FOR_DENY_ONLY. A restricted token may also have reduced access if the parent token is a normal user-based token and the restricted token has restricted SIDs therein, or if the parent token itself includes restricted SIDs and the (child) restricted token has fewer restricted SIDs therein. Similarly, as used hereinafter, running with increased or elevated "privileges" will be the same as running with increased "access," even though the increased access may actually result from security IDs in the token rather than via actual privileges listed in the token.

In any event, a first way in which least (i.e., in some way reduced) privileges may be enforced is to logically connect restrictions to applications. More particularly, restricted execution contexts allow the operating system to create separate restricted security IDs for each application, as well as for each resource. The operating system may then include a secure application launcher that knows what resources an application needs to access, and via a restricted token, limit the application (i.e., its processes) to accessing only those resources.

Figure 8:
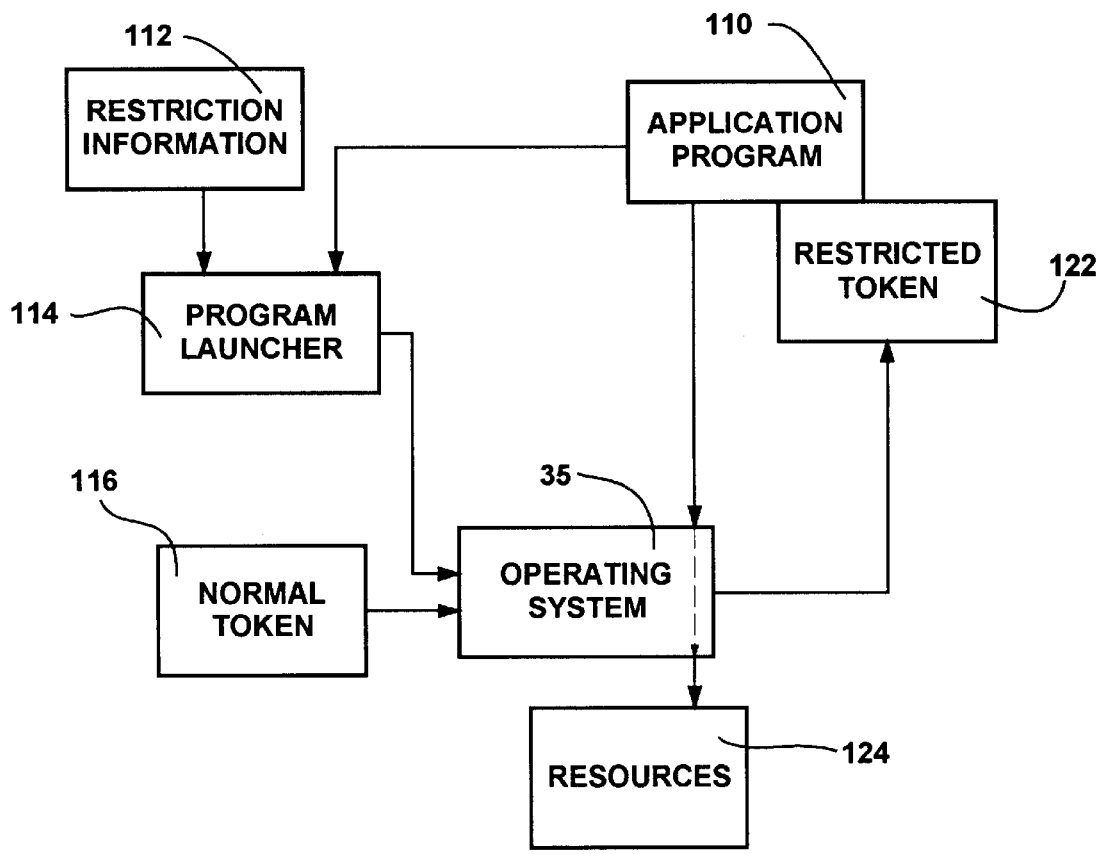
FIG. 8 is a block diagram of various components for automatically running an application program with reduced privileges in accordance with one aspect of the present invention.

Thus, in accordance with another aspect of the present invention and as represented in FIG. 87 an application program 110 (FIG. 8) may have restriction information 112 associated therewith. For example, applications may be shipped with default restrictions, and/or an administrator or the like may set restrictions therefor when installing the application. The information 112 may include restrictions such as which files or directories the application may access, whether the application needs an administrator to run it, or whether the application needs to launch any other programs. The system stores this restriction information 112 in a database, or other non-volatile memory or the like. For example, a program launcher 114 such as Windows Explorer may store the information in its explorer link files.

When run, the program launcher 114 reads the restriction information 112, and based on the stored information, creates a restricted token 122 from the normal, user-based token 116. As a result, the application program 110 is restricted to accessing only those resources 124 to which the restricted token 122 allows access. For example, via the restricted token 122, a game program 110 may be restricted to only accessing its own data files.

Figure 9:
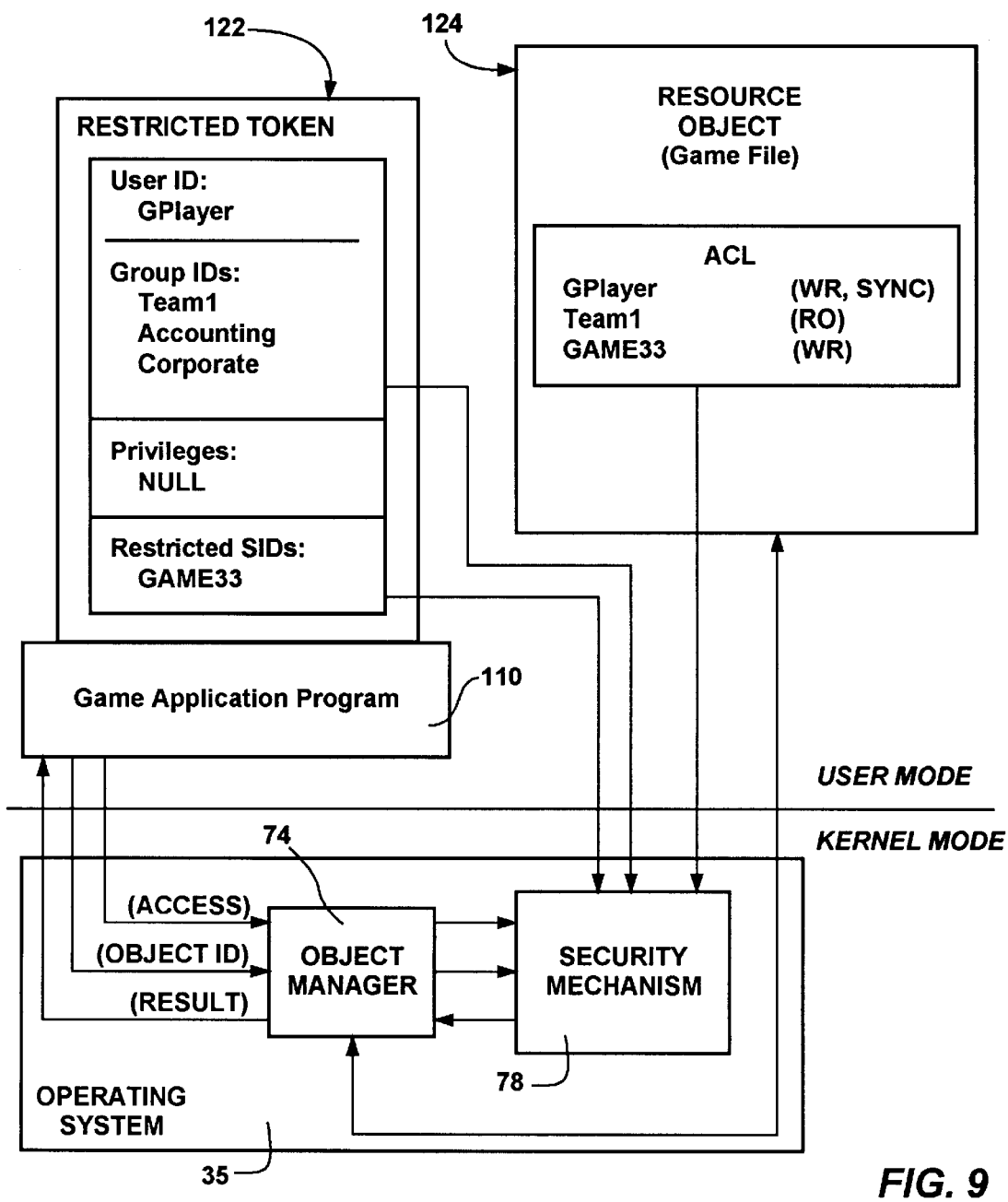
FIG. 9 is a block diagram generally representing a process having a restricted token automatically associated therewith attempting to access a resource in accordance with one aspect of the present invention.

To this end, as shown in FIG. 9, the restricted token 122 includes in its restricted SIDs field a restricted SID that identifies the application, e.g., shown as "GAME33" in FIG. 9. As also shown in FIG. 9, the ACL associated with each of the game's data files (e.g., the resource object 124) include one or more identifiers (also shown as "GAME33") corresponding to the restricted SID or SIDs placed in the restricted token 122. When the access evaluation is performed, as described above, the application 110 will be granted access to this file object 124 because both the user SID and restricted SID match entries in the security descriptor. However, as determined by the administrator via the operating system 35, the security descriptors of other files in the system lack such a "GAME33" SID, thereby preventing the game program 110 from accessing those other files.

Another use is to control viruses by granting an application access only to the one file being edited instead of range of files. In this manner, a macro virus is effectively stopped by not letting the document access other documents.

Figure 10:
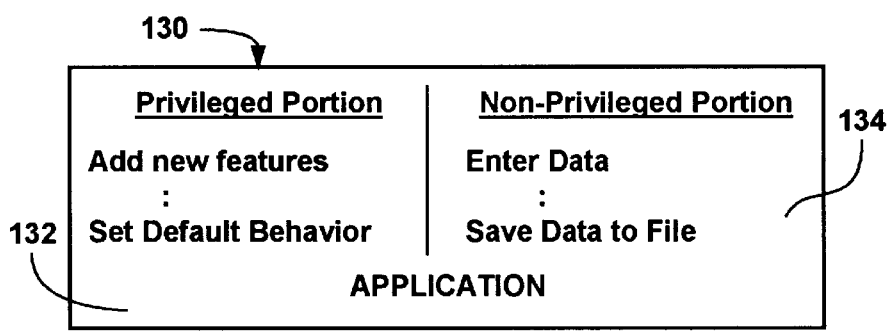
FIG. 10 is a diagram representing an application program split into privileged and non-privileged portions in accordance with one aspect of the present invention.

Yet another way in which to restrict access to an application is by separating the application itself into restricted and non-restricted portions. Of course, the application may have additional granularity and be separated into more than two portions based on restriction levels. By way of example, as shown in FIG. 10, an application program 130 may have its functions divided between administrative and non-administrative types of activities. In this manner, an administrator running with elevated privileges will be able to perform such tasks as adding new features to the application or setting its default behavior. Note that via restricted tokens, this may be accomplished in any number of ways, such as by denying access to non-administrators to dynamic link libraries (DLLs) containing certain functions and/or the data files that store the default information. Another way is to associate a token with each process that each function attempts to perform, e.g., restricted token for functions designated as non-privileged and a normal token for privileged functions. In any event, ordinary users having less access will be able to perform normal functions such as entering and saving data, while higher-level user will be able to perform administrative-like functions. Of course, some functions may be logically in both groups by allowing access thereto by any type of valid user.

Note that the separate portions may be mutually exclusive with respect to access. For example, using restricted tokens, such as to grant or deny access to certain functions for administrators, the application may be written such that administrators will not be able to perform normal functions when running in the administrative mode, and vice-versa. This prevents an administrator who is performing non-administrative tasks in the normal mode (e.g., entering data) from inadvertently doing some damage (e.g., deleting files) via a privileged function. Further, to highlight the mode of operation, the application may have a different appearance (e.g., a different color scheme) depending on the mode in which it is being run.

Moreover, the present invention provides the ability to specify that no program can normally be run with administrator privileges. This may be enforced by requiring the user to launch programs with administrator privileges from a secure desktop (i.e., one managed by the operating system). This forces the user to explicitly use administrative privileges instead of just trusting the programs.

Yet another way to ensure that a user operates with least (or in some way reduced) privileges is to have the system default such that each user runs with a restricted token granting only a necessary amount of access. In general, if a qualified user needs to do a task that requires increased access, the user or the operating system needs to perform an explicit operation to obtain that access. To this end, a user having processes associated with a restricted token may temporarily have his or her processes associated with a token (restricted or normal) having increased access. Once the task is performed, the enhanced access is then removed by restoring the restricted token to the user's processes.

Figure 11:
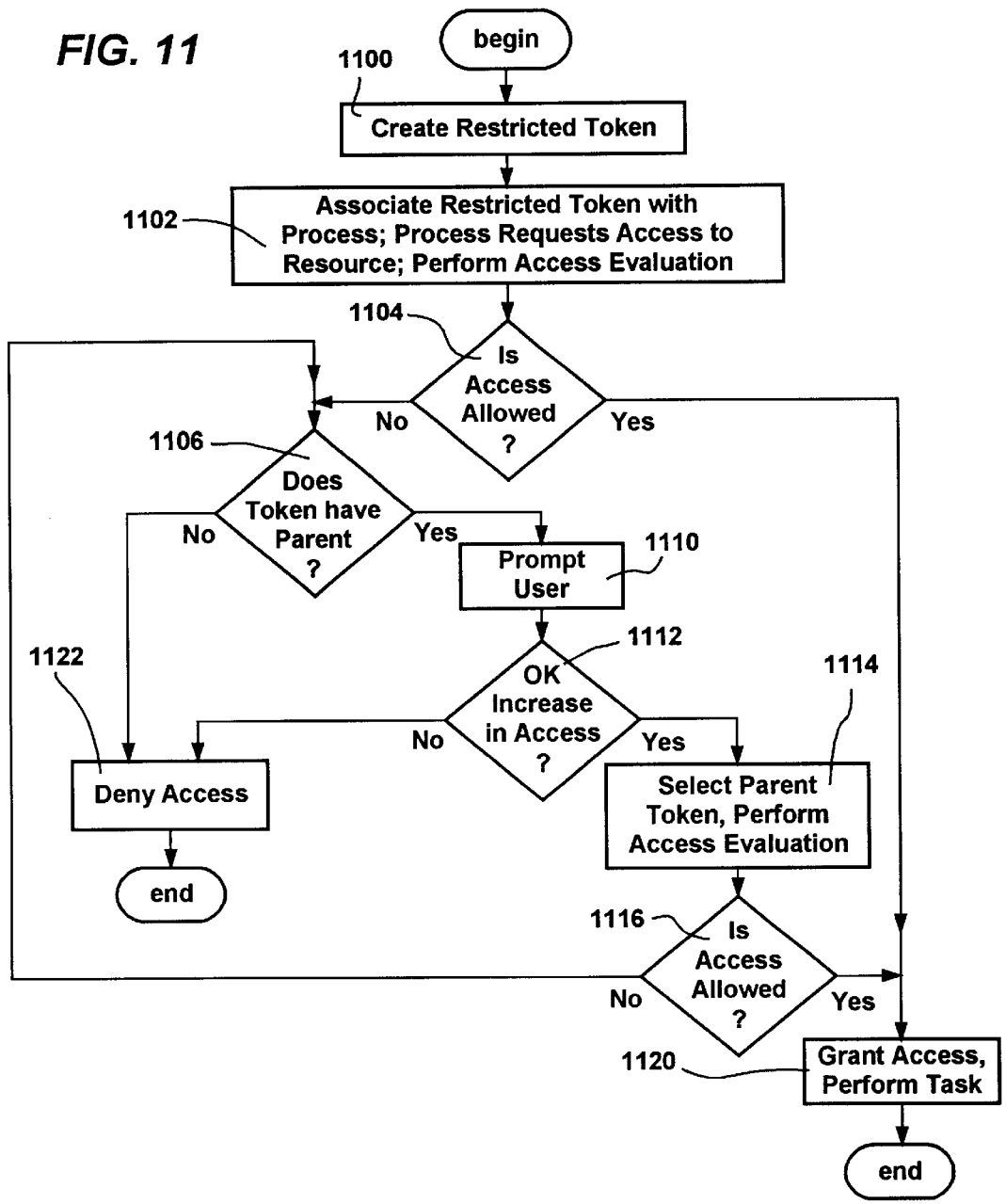
FIG. 11 is a is a flow diagram representing general steps taken to enforce a user running with reduced access in accordance with one aspect of the present invention.

FIG. 11 represents how a system may enforce operation with least or reduced access. In operation, beginning at step 1100, a restricted token is created for a user that has less access than that user's normal token. As described above, this is accomplished by changing the attributes of user and group SIDs to USE_FOR_DENY_ONLY, removing one or more privileges and/or adding restricted SIDs to the restricted token with respect to the normal parent token. Then, at step 1102, the restricted token is associated with the user's restricted process. As also shown at step 1102, when the process attempts to access a resource, an access evaluation is performed, using the restricted token against the security descriptor of the resource, as described above. Note that more than two levels of restriction are feasible, (e.g., a normal token, a first restricted token created from the normal token and a second restricted token created from the first restricted token). If more than two levels are desired, the restricted token associated with the process at step 1102 is typically the one with the least access. The user thus defaults to using a reduced (e.g., the lowest possible) access level for each task.

At step 1104, the operating system (i.e., the security mechanism therein) determines whether access (of the desired type) is allowed, and if so, branches to step 1120 where the appropriate type of access is granted and the task performed. Note that when restricted SIDs are present and access is not via a privilege, the access evaluation comprises the two-part access check as described above.

In keeping with the invention, if at step 1104 access is not allowed, instead of denying access, the operating system may give the user an additional opportunity to access the resource using a token with increased access. To this end, step 1106 tests to determine if the user's token is a restricted token. This determination may be made via the token's ParentTokenID field, since a restricted token has a non-NULL parent token identified in that field. If the token does not have a parent (step 1106), then access is immediately denied at step 1122 since the user does not have access rights with his or her normal token regardless of any restrictions.

Alternatively, if the token has a parent at step 1106, the system prompts the user at step 1110 to determine whether the user wants to try accessing the resource again at an increased access level, i.e., with the restricted token's parent token. In this manner, a user is made aware of a possibly dangerous situation, i.e., something extraordinary is pending. If the user decides not to attempt to perform the task with increased access, step 1112 branches to step 1122 where access is denied. However, if the user decides that the action is indeed desirable, (e.g., do indeed attempt to delete all files on a disk drive), the user responds affirmatively to the prompt, whereby step 1112 branches to step 1114 wherein the access is increased by associating the parent token with the process, and the evaluation again performed. If access is allowed (step 1116), the requested task is performed at step 1118. If access is not allowed at step 1116, step 1106 is again performed to determine if the token has a parent token. In this manner, more than two levels of restrictions are supported.

Note that the above-described mechanism is not for the purpose of denying access to a qualified user, but rather is for the purpose of warning the qualified user that an event requiring a higher access level has been requested. The user must take a second, definite action before the event will be performed. However, in any situation, the user has no additional rights above those granted by the user's normal token.

Thus, for example, an administrator will set up a restricted token for running his or her tasks. The restricted token restricts the administrator to running with the privileges and access rights granted to non-administrators of the group. Once set up in this manner, as described above, the administrator cannot inadvertently do something to damage the system (e.g., delete all files on a disk drive), without being prompted that the requested action is at a higher level than for ordinary users. The prompt and response mechanism ensures that only a specific override will allow the administrative-level action.

As can be seen from the foregoing detailed description, there is provided an improved security model that enforces operation with least (or in some way reduced) privileges via restricted tokens. The enforcement is automatic, and may, for example, be based on the application, written into the application and/or provided by the system via a prompt and response mechanism.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a system having a security mechanism that determines access to resources based on information in an access token against security information associated with each of the resources, a method of restricting the access of an application to system resources, comprising, storing restriction information with respect to the application, the restriction information related to access of the application to the resources, receiving a request to run the application, creating a restricted access token based on the parent token and the restriction information, the restricted access token providing reduced access with respect to a parent access token, and associating the restricted token with the application.

2. The method of claim 1 further comprising running the application, and attempting to access the system resources using the restricted token as the access token of the application.

3. The method of claim 1 wherein storing restriction information with respect to the application includes identifying at least one file to which the application has access.

4. The method of claim 3 wherein storing restriction information with respect to the application includes limiting the application to one file.

5. The method of claim 1 wherein storing restriction information with respect to the application includes identifying at least one other application that the application may launch.

6. The method of claim 1 wherein creating a restricted access token includes, copying access information from the parent token into the restricted token, and adding at least one restricted security identifier to the restricted token.

7. The method of claim 6 wherein adding at least one restricted security identifier to the restricted token includes adding a restricted security identifier corresponding to the application.

8. The method of claim 1 wherein creating a restricted access token includes copying access information from the parent token into the restricted token, and removing at least one privilege from the restricted token relative to the parent token.

9. The method of claim 1 wherein creating a restricted access token from the parent token includes changing attribute information of a security identifier in the restricted token to use for deny only access via that security identifier, relative to attribute information of a corresponding security identifier in the parent token.

10. The method of claim 9 wherein separating at least some of the functions of an application into at least two groups includes, separating the functions into privileged and non-privileged portions, wherein associating the restricted token with at least one of the groups includes associating the restricted token with the non-privileged portion, and further comprising associating the parent token with the privileged portion.

11. A computer-readable medium having computer-executable instructions for performing the method of claim 1.

12. In a system having a security mechanism that determines access of processes to resources based on information in an access token associated with each of the processes against security information associated with each of the resources, a method of restricting the access of an application's functions to system resources, comprising, separating at least some of the functions of an application into at least two groups, creating an access token for each group, at least one of the access tokens being a restricted token having reduced access relative to a parent token, and associating the restricted token with at least one of the groups of functions.

13. A computer-readable medium having computer-executable instructions for performing the method of claim 12.

14. In a system having a security mechanism that grants or denies a process access to a resource by comparing information in an access token associated with the process against information in an access control list associated with the resource, a method of attempting to access the resource, comprising, creating a restricted access token from a parent token, the restricted token having less access than the parent token, receiving a request to grant the process access to the resource, attempting to access the resource with the restricted token, and if access is denied, attempting to access the resource with the parent token.

15. The method of claim 14 wherein attempting to access the resource with the parent token includes receiving a response from a user of the system.

16. The method of claim 15 further comprising prompting the user for the response.

17. The method of claim 14 wherein the parent token has a higher parent token with increased access relative thereto, and wherein attempting to access the resource with the parent token further includes attempting to access the resource with the higher parent token if the system denies access to the parent token.

18. The method of claim 14 wherein creating a restricted access token from a parent token includes removing at least one privilege from the restricted token relative to the parent token.

19. The method of claim 14 wherein creating a restricted access token from a parent token includes changing attribute information of a security identifier in the restricted token to use for deny only access via that security identifier, relative to attribute information of a corresponding security identifier in the parent token.

20. The method of claim 14 wherein the parent token is a normal token, and wherein creating a restricted access token from a parent token includes adding a restricted security identifier to the restricted token relative to the parent token.

21. The method of claim 14 wherein the parent token is a restricted token having at least one restricted security identifier therein, and wherein creating a restricted access token from a parent token includes removing at least one restricted security identifier from the restricted token relative to the parent token.

22. The method of claim 14 wherein attempting to access the resource with the restricted token includes associating the process with the restricted token.

23. The method of claim 14 wherein attempting to access the resource with the parent token includes associating the process with the parent token.

24. A computer-readable medium having computer-executable instructions for performing the method of claim 12.

25. A system, comprising,
a set of resources, each resource having security information associated therewith;
a set of restriction information associated with a requesting entity and related to access of the requesting entity to the resources;
a mechanism configured to create a restricted access token from a parent access token and the set of restriction information, and to associate the restricted access token with a process of the requesting entity, the restricted access token having reduced access relative to the parent access token; and
a security mechanism configured to determine access of the process to a resource in the set of resources based on information in the restricted access token against the security information associated with that resource.

26. The system of claim 25 wherein the requesting entity comprises an application program.

27. The system of claim 25 wherein the mechanism configured to create the restricted access token comprises a program launcher.

28. The system of claim 25 wherein the security mechanism is incorporated into an operating system.

29. The system of claim 25 wherein the restriction information identifies at least one file.

30. A system, comprising,
a set of resources, each resource having security information associated therewith;
a set of access tokens including a parent access token and at least one restricted access token created from the parent access token and having reduced access relative to the parent access token;
a requesting entity;
a mechanism configured to determine a selected access token from the set of access tokens based on an operating mode of the requesting entity and a process corresponding to the operating mode, and to associate the selected access token with the process; and
a security mechanism configured to determine access of the process to a resource in the set of resources based on information in the selected access token against the security information associated with that resource.

31. The system of claim 30 wherein the requesting entity comprises an application program.

32. The system of claim 31 wherein the application program includes a plurality of operating modes, each operating mode having at least one application function corresponding thereto.

33. The system of claim 30 wherein the mechanism configured to determine the selected access token comprises a program launcher that evaluates restriction information associated with the requesting entity.

34. The system of claim 30 wherein the mechanism configured to determine the selected access token determines as the selected access token a first restricted access token on a first attempt to access the resource, and determines as the selected access token a second access token on a second attempt to access the resource.

35. The system of claim 34 wherein the second access token comprises the parent access token.

36. The system of claim 30 wherein the security mechanism is incorporated into an operating system.

37. A computer-implemented method, comprising,
selecting a selected access token from a set of access tokens, the set of access tokens including a parent access token and at least one restricted access token created from the parent access token and having reduced access relative to the parent access token;
associating the selected access token with a process of an requesting entity, the requesting entity capable of requesting access to a set of resources; and
providing the selected access token to a security mechanism upon a request by the requesting entity for access to a resource of the set, the security mechanism determining access of the process to the resource based on the selected access token and security information associated with the resource.

38. The method of claim 37 wherein selecting a selected access token includes determining an operating mode of the requesting entity.

39. The method of claim 37 wherein selecting a selected access token includes determining a function to be executed by the requesting entity.

40. The method of claim 37 further comprising creating a restricted access token based on restriction information associated with the requesting entity.

41. The method of claim 37 wherein selecting a selected access token includes determining that a previously selected access token has been denied access to the resource.

42. The method of claim 37 wherein selecting a selected access token includes determining that a previously selected access token. has been denied access to the resource, and receiving a request to attempt access with another access token.

43. A computer-readable medium having computer-executable instructions for performing the method of claim 37.

UNITED STATES PATENT AND TRADEMARK OFFICE
CERTIFICATE OF CORRECTION

PATENT NO. : 6,308,274 B1
DATED : October 23, 2001
INVENTOR(S) : Swift et al.

It is certified that error appears in the above-identified patent and that said Letters Patent is hereby corrected as shown below:

Column 2,
Line 28, "into the" should read -- into which the --.
Line 58, "is a is a" should read -- is a --.

Column 5,
Line 24, "security-check" should read -- security check --.

Column 6,
Line 36, "process'" should read -- process's --.

Column 9,
Line 18, "PSID_AND _ATTRIBUTES RestrictedSids;" should all be bold
-- PSID_AND _ATTRIBUTES RestrictedSids --.
Line 42, "USE FOR DENY ONLY" should read -- USE_FOR_DENY_ONLY --.
Lines 60-61, "USE FOR_DENY_ONLY" should read -- USE_FOR_DENY_ONLY --.
Line 50, "Field" should read -- field --.

Column 10,
Lines 20-21, "IsTokenRestricted" should read -- IsTokenRestricted, --.

Column 12,
Line 59, "explorer" should read -- Explorer --.

Column 13,
Line 17, "of range" should read -- of a range --.
Line 40, "user" should read -- users --.

Column 15,
Line 61, "includes, copying" should read -- includes copying --.

Column 16,
Line 13, "groups includes, separating" should read -- groups includes separating --.

UNITED STATES PATENT AND TRADEMARK OFFICE
CERTIFICATE OF CORRECTION

PATENT NO.   : 6,308,274 B1
DATED        : October 23, 2001
INVENTOR(S)  : Swift et al.

It is certified that error appears in the above-identified patent and that said Letters Patent is hereby corrected as shown below:

Column 17,
Lines 20 and 46, "comprising," should read -- comprising: --.

Column 18,
Line 24, "comprising," should read -- comprising: --.
Line 31, "of an requesting" should read -- of a requesting --.
Line 54, "token, has" should read -- token has --.

Signed and Sealed this

Second Day of November, 2004

JON W. DUDAS
*Director of the United States Patent and Trademark Office*